United States Patent

Lehmeier et al.

[11] Patent Number: 5,942,344
[45] Date of Patent: Aug. 24, 1999

[54] HIGH-TEMPERATURE FUEL CELL SYSTEM AND METHOD FOR ITS OPERATION

[75] Inventors: Jürgen Lehmeier, Hannover; Kurt Reiter, Erlangen; Gerald Stief, Nürnberg, all of Germany

[73] Assignee: Siemens Aktiengesellschaft, Munich, Germany

[21] Appl. No.: 09/001,043

[22] Filed: Dec. 30, 1997

Related U.S. Application Data

[63] Continuation of application No. PCT/DE96/01116, Jun. 25, 1996.

[30] Foreign Application Priority Data

Jun. 30, 1995 [DE] Germany .................. 195 23 973

[51] Int. Cl.⁶ ........................................... H01M 8/04
[52] U.S. Cl. ............................................. 429/13; 429/26
[58] Field of Search ................... 429/13, 24, 26

[56] References Cited

U.S. PATENT DOCUMENTS

| 2,980,749 | 4/1961 | Broers . | |
| 3,293,079 | 12/1966 | Brodd | 429/26 X |
| 3,718,506 | 2/1973 | Fischer et al. . | |
| 3,865,630 | 2/1975 | Reimers | 429/26 |
| 4,548,875 | 10/1985 | Lance et al. | 429/26 |
| 4,808,491 | 2/1989 | Reichner | 429/26 X |
| 5,366,819 | 11/1994 | Hartvigsen et al. | 429/26 X |

FOREIGN PATENT DOCUMENTS

| 0654838A1 | 5/1995 | European Pat. Off. . |
| 1585403 | 1/1970 | France . |
| 1119352 | 12/1961 | Germany . |
| 1496346 | 5/1969 | Germany . |
| 1496128 | 6/1969 | Germany . |
| 4037970A1 | 6/1991 | Germany . |
| 4223291A1 | 1/1993 | Germany . |
| 95/18469 | 7/1995 | WIPO . |

OTHER PUBLICATIONS

Japanese Patent Abstract No. 4004570 (Yasutaka et al.), dated Jan. 9, 1992.
Japanese Patent Abstract No. 62061276 (Kiyoshi), dated Mar. 17, 1987.
Japanese Patent Abstract No. 59209280 (Nobuyuki et al.), dated Nov. 27, 1984.
Japanese Patent Abstract No. 62122073 (Kenichi), dated Jun. 3, 1987.
Japanese Patent Abstract No. 63168972 (Kenichi), dated Jul. 12, 1988.
"A Study for a 200 kWe System for Power and Heat" (Taylor et al.), published in the "First European Solid Oxide Fuel Cell Forum", Lucerne 1994, pp. 849–871 (Month Unknown).

Primary Examiner—Stephen Kalafut
Attorney, Agent, or Firm—Herbert L. Lerner; Laurence A. Greenberg

[57] ABSTRACT

A high-temperature fuel cell system and a method for its operation include at least one electrical heating element for heating at least one high-temperature fuel cell block. The heating element is disposed outside the high-temperature fuel cell block. As a result, the fuel cells are neither polluted nor damaged.

8 Claims, 1 Drawing Sheet

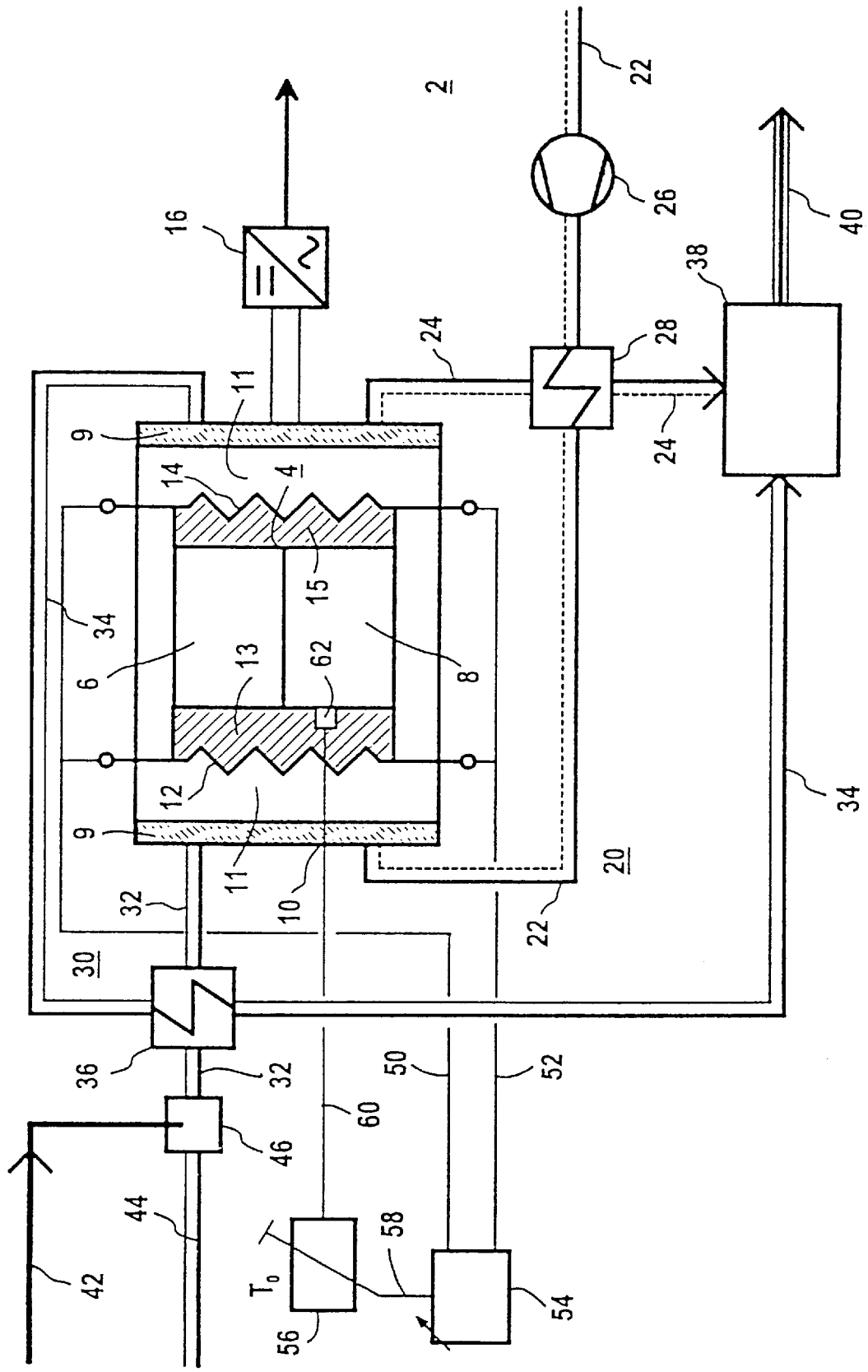

HIGH-TEMPERATURE FUEL CELL SYSTEM AND METHOD FOR ITS OPERATION

CROSS-REFERENCE TO RELATED APPLICATION

This application is a continuation of International Application Serial No. PCT/DE96/01116, filed Jun. 25, 1996, which designated the United States.

BACKGROUND OF THE INVENTION

Field of the Invention

The invention relates to a high-temperature fuel cell system and to a method for operating the fuel cell system.

It is known that water molecules are decomposed by electrical current into hydrogen and oxygen during the electrolysis of water. In a fuel cell, that process takes place in the opposite direction. When hydrogen and oxygen are electrochemically combined to form water, electric current is produced, with high efficiency and without any emission of hazardous materials or carbon dioxide, if pure hydrogen is used as a combustion gas. Even with technical combustion gases, for example natural gas or coal gas, and with air or air enriched with $O_2$ instead of pure oxygen, a fuel cell produces considerably fewer hazardous materials and less $CO_2$ than other energy producers that operate with fossil energy sources. The technical implementation of the principle of the fuel cell has led to widely different solutions, to be precise with various types of electrolytes and with operating temperatures $T_0$ between 80° C. and 1000° C. Fuel cells are divided on the basis of their operating temperature $T_0$ into low, medium and high-temperature fuel cells, which in turn are distinguished by various technical configurations.

In the case of the high-temperature fuel cell (Solid Oxide Fuel Cell, SOFC), for example, natural gas is used as the primary energy source. The very compact structure allows a power density of 1 $MW/m^3$. The operating temperatures $T_0$ are above 900° C.

As a rule, a fuel cell block, which is also called a "stack" in the specialist literature, is composed of a large number of fuel cells of planar construction that are stacked one above the other.

In order to operate a fuel cell system including at least one fuel cell block at a high, constant operating temperature $T_0$ of more than 900° C., for example, it must be supplied with heat before operation in order to reach the operating temperature $T_0$, and it must be supplied with heat in order to maintain the required operating temperature $T_0$ during brief breaks in operation. Present-day fuel cell blocks have relatively low power levels and have dimensions on a laboratory scale. A furnace is used to raise them to the operating temperature $T_0$ of about 600° C. for MCFC (Molten Carbonate Fuel Cell) or about 950° C. for SOFC, and they are operated in the furnace. That solution is impractical for fuel cell blocks with higher power levels and larger dimensions.

A symposium report entitled "A Study for a 200 kWe-System for Power and Heat", by M. R. Taylor and D. S. Beishon, in the "First European Solid Oxide Fuel Cell Forum", Lucerne 1994, pages 849 to 864, discloses a method which passes power-plant gas through the fuel cell block in order to heat it. That method is disadvantageous since the power-plant gas pollutes or damages the fuel cells of which the fuel cell block is composed.

German Published, Non-Prosecuted Patent Application DE 42 23 291 A1 discloses a fuel cell system unit which includes a cell stack composed of a large number of individual fuel cells. When operation starts, an apparatus disposed outside the fuel cell system unit for raising the temperature heats water passing through the fuel cell system unit, as a result of which the individual fuel cells are preheated to a predetermined temperature.

German Published, Non-Prosecuted Patent Application DE 40 37 970 A1 discloses a method in which operating material for the fuel cell stack is heated by hot exhaust gas from a fuel cell stack. Such a method is also disclosed in Published European Patent Application 0 654 838 A1.

SUMMARY OF THE INVENTION

It is accordingly an object of the invention to provide a high-temperature fuel cell system and a method for its operation, which overcome the hereinafore-mentioned disadvantages of the heretofore-known devices and methods of this general type and in which the high-temperature fuel cells are not polluted or damaged during heating.

With the foregoing and other objects in view there is provided, in accordance with the invention, a high-temperature fuel cell system, comprising at least one high-temperature fuel cell block; and at least one electrical heating element disposed outside the at least one high-temperature fuel cell block for heating the at least one high-temperature fuel cell block.

The use of the electrical heating element ensures good temperature regulation.

In accordance with another feature of the invention, the electrical heating element is disposed inside a high-temperature fuel cell container having thermal insulation. In consequence, only a small amount of heat is emitted into the environment from the high-temperature fuel cell container.

In accordance with a further feature of the invention, an intermediate space between the heating element and the high-temperature fuel cell block is filled by thermally conductive material. The heat transfer between the electrical heating element and the high-temperature fuel cell block is particularly good as a result of this measure. The heating element can, of course, also be fitted closely against the outer wall of the fuel cell block.

With the objects of the invention in view there is also provided a method for operating a high-temperature fuel cell system, which comprises providing at least one high-temperature fuel cell block; and heating the at least one high-temperature fuel cell block from the outside with at least one electrical heating element.

In this case, the electrical heating element heats the high-temperature fuel cell block independently of the heat produced during the reaction process. Thus no power-plant gas is used for heating. In consequence, there is no pollution or damage to the high-temperature fuel cells caused by the effects of power-plant gas. The high-temperature fuel cell block is not heated in a special furnace, that is to say the method can be applied to any required configuration of high-temperature fuel cell blocks. The method is thus independent of power levels and dimensions of the high-temperature fuel cell blocks, and is thus likewise independent of dimensions of the high-temperature fuel cell system.

In accordance with another mode of the invention, the high-temperature fuel cell block is heated from an initial temperature to a required operating temperature $T_0$. No consumables, for example hydrogen $H_2$ or oxygen $O_2$, are required for heating. In consequence, costs for consumables during the heating of the high-temperature fuel cell block are saved.

In accordance with a concomitant mode of the invention, the high-temperature fuel cell block is kept at the required operating temperature $T_0$. An electrical control loop can be provided for this purpose. In consequence, power fluctuations resulting from fluctuations in the operating temperature $T_0$ are compensated for or avoided. After relatively short breaks in operation, the high-temperature fuel cell block no longer needs to be raised to the required operating temperature $T_0$ again, as a result of which costs for consumables as well as time are saved.

Other features which are considered as characteristic for the invention are set forth in the appended claims.

Although the invention is illustrated and described herein as embodied in a high-temperature fuel cell system and a method for its operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block diagram of a high-temperature fuel cell system of the invention.

DESCRIPTION OF THE PREFERRED EMBODIMENTS

Referring now in detail to the single FIGURE of the drawing, there is seen a high-temperature fuel cell system 2 which includes a high-temperature fuel cell block 4 that is split into an anode part 6 with anode gas areas which are not illustrated further, and a cathode part 8 with cathode gas areas which are not illustrated further. The high-temperature fuel cell block 4 is composed of a large number of high-temperature fuel cells which are of planar construction and are not illustrated further, but are known, for example, from German Patent 39 35 722, corresponding to European Patent 0 425 939. An output of the high-temperature fuel cell block 4 is connected to an invertor 16, which converts direct current produced by the high-temperature fuel cell block 4 into alternating current for an electrical power system that is not illustrated further herein. The high-temperature fuel cell block 4 is disposed on inner walls of a high-temperature fuel cell container 10 having thermal insulation 9. In addition, two electrical heating elements 12, 14 are each disposed in an interior 11 of the high-temperature fuel cell container 10, outside the high-temperature fuel cell block 4. The heating elements 12, 14 are located on two opposite walls. Otherwise, an intermediate space between the fuel cell block 4 and the heating elements 12, 14 is filled with thermally conductive material 13, 15. Heat transfer between the electrical heating elements 12, 14 and the high-temperature fuel cell block 4 is improved by the thermally conductive material 13, 15.

The electrical heating elements 12, 14 are in thermal contact with the high-temperature fuel cell block 4. No power-plant gas is required in this case for heating. Consequently, there is no pollution of or damage to the high-temperature fuel cells because of the effects of power-plant gas. The method can be applied to any required configuration of high-temperature fuel cell blocks. It is thus independent of the power levels and the dimensions of the fuel cell blocks, and it is thus likewise independent of the dimensions of the fuel cell system 2.

Through the use of this method, the high-temperature fuel cell block 4 is heated to its operating temperature $T_0$, or is held at that temperature during brief breaks in operation. A temperature T of the high-temperature fuel cell block 4 is regulated for this purpose. In this case the temperature T which acts as a controlled variable is detected continuously by a temperature sensor 62 which is fitted closely against an outer wall of the high-temperature fuel cell block 4 and is connected through an electrical signal line 60 to a regulation unit 54. The operating temperature $T_0$ is made available as a reference variable to the regulation unit 54 by a set value transmitter 56, through an electrical signal line 58.

The controlled variable T is continuously compared with the reference variable $T_0$ in the regulation unit 54. The electrical heating elements 12, 14 are heated as appropriate through electrical cables 50, 52, for the purpose of matching to the reference variable $T_0$.

The cathode part 8 is allocated a cathode system 20, which includes an inlet path 22 and an outlet path 24. A process gas for the cathode part 8, for example oxygen $O_2$, is fed through the inlet path 22 into the high-temperature fuel cell block 4 by a compressor 26. After a reaction, the process gas is removed through the outlet path 24. The inlet path 22 has a first heat exchanger 28 disposed therein, in which process exhaust gas heats the process gas being supplied for the cathode part 8.

After leaving the first heat exchanger 28, the process exhaust gas from the cathode part 8 is passed through the outlet path 24 to a device 38 for processing residual gases. The processed gases are passed outward from this device 38 through an exhaust line 40 for further use.

The anode part 6 is assigned an anode system 30 which includes an inlet path 32 and an outlet path 34. The process gas for the anode part 6, for example hydrogen $H_2$, is passed through the inlet path 32. The inlet path 32 has a second heat exchanger 36 disposed therein, in which the process exhaust gas removed from the anode part 6 through the outlet path 34 heats the process gas being supplied to the anode part 6. The outlet path 34 opens into the device 38 for processing the residual gases.

Alternatively, process gases for operation of the high-temperature fuel cell system 2, for example combustion gas and reaction vapor, can be fed into the inlet path 32 through supply lines 42 and 44 and a mixer 46.

We claim:

1. A high-temperature fuel cell system, comprising:

at least one high-temperature fuel cell block;

at least one electrical heating element disposed outside said at least one high-temperature fuel cell block for heating said at least one high-temperature fuel cell block, said at least one heating element and said at least one high-temperature fuel cell block spaced apart and defining an intermediate space therebetween; and a thermally conductive material filling the intermediate space.

2. The high-temperature fuel cell system according to claim 1, including a high-temperature fuel cell container having thermal insulation, said at least one electrical heating element disposed inside said high-temperature fuel cell container.

3. A method for operating a high-temperature fuel cell system, which comprises:

providing at least one high-temperature fuel cell block;

providing at least one electrical heating element outside and spaced apart from the at least one high-temperature fuel cell block;

filling an intermediate space between the at least one heating element and the at least one high-temperature fuel cell block with a thermally conductive material; and heating the at least one high-temperature fuel cell block from the outside with the at least one electrical heating element.

4. The method according to claim 3, which comprises heating the at least one high-temperature fuel cell block to a temperature within a range of temperatures in which the high-temperature fuel cell block is operable.

5. The method according to claim 3, which comprises maintaining the at least one high-temperature fuel cell block at a temperature within a range of temperatures in which the high-temperature fuel cell block is operable.

6. A method for operating the high-temperature fuel cell system of claim 1, which comprises:

heating the at least one high-temperature fuel cell block from the outside with the at least one electrical heating element.

7. The method according to claim 6, which comprises heating the at least one high-temperature fuel cell block to a temperature within a range of temperatures in which the high-temperature fuel cell block is operable.

8. The method according to claim 6, which comprises maintaining the at least one high-temperature fuel cell block at a temperature within a range of temperatures in which the high-temperature fuel cell block is operable.

* * * * *